United States Patent
Forssell et al.

(10) Patent No.: US 10,167,866 B2
(45) Date of Patent: Jan. 1, 2019

(54) DISPLACEMENT PUMP AND A CONTROL RING FOR A DISPLACEMENT PUMP

(71) Applicant: VOLVO CAR CORPORATION, Gothenburg (SE)

(72) Inventors: Jonas Forssell, Torslanda (SE); Christer Odenmarck, Torslanda (SE)

(73) Assignee: VOLVO CAR CORPORATION (SE)

( * ) Notice: Subject to any disclaimer, the term of this patent is extended or adjusted under 35 U.S.C. 154(b) by 566 days.

(21) Appl. No.: 14/578,600

(22) Filed: Dec. 22, 2014

(65) Prior Publication Data
US 2015/0198158 A1 Jul. 16, 2015

(30) Foreign Application Priority Data

Jan. 10, 2014 (EP) .................................... 14150744

(51) Int. Cl.
*F01C 1/10* (2006.01)
*F04C 2/10* (2006.01)
(Continued)

(52) U.S. Cl.
CPC .......... *F04C 15/0049* (2013.01); *F01C 1/103* (2013.01); *F01C 20/14* (2013.01);
(Continued)

(58) Field of Classification Search
CPC ...... F04C 18/00; F04C 29/12; F04C 15/0026; F04C 2/084; F04C 2/10; F04C 2/102;
(Continued)

(56) References Cited

U.S. PATENT DOCUMENTS 3,011,447 A 12/1961 Brundage
3,334,590 A 8/1967 Waddington
(Continued)

FOREIGN PATENT DOCUMENTS

CN 1837614 A 9/2006
CN 100371596 C 2/2008
(Continued)

OTHER PUBLICATIONS

Extended European Search Report dated Mar. 25, 2014, Application No. 14150744.2-1608, Applicant Volvo Car Corporation, 7 Pages.
(Continued)

*Primary Examiner* — Alexander B Comley
(74) *Attorney, Agent, or Firm* — Brooks Kushman P.C.

(57) ABSTRACT

A control ring for controlling the flow of a pressure medium in a displacement pump is provided. The control extends along a first rotational axis, and includes a first and a second axial surface. The first axial surface has an interface section provided with at least a first and a second opening, which first and second openings are arc shaped and are separated by a first and a second land. The first land is provided with a first tapered groove extending from the first opening into the first land, and having its broader edge in a direction of the first opening and its tip in a direction of the second opening. The first tapered groove extends into the first land such that an angular distance between the first and second openings over the first land is different at different radial distances.

26 Claims, 7 Drawing Sheets

(51) Int. Cl.
*F01C 20/14* (2006.01)
*F04B 11/00* (2006.01)
*F04C 14/14* (2006.01)
*F04C 15/00* (2006.01)
*F04C 15/06* (2006.01)
*F16H 39/36* (2006.01)

(52) U.S. Cl.
CPC ............... *F04C 2/10* (2013.01); *F04C 2/102* (2013.01); *F04C 14/14* (2013.01); *F04C 15/06* (2013.01); *F04B 11/00* (2013.01); *F16H 39/36* (2013.01)

(58) Field of Classification Search
CPC ...... F04C 14/14; F04C 15/0049; F04C 15/06; F01C 1/103; F01C 20/14; F16H 39/36; F04B 11/00
USPC .... 418/166, 171, 206.4, 75–77, 80–81, 132; 91/485, 499; 417/410.3, 410.4
See application file for complete search history.

(56) References Cited

U.S. PATENT DOCUMENTS

| | | | |
|---|---|---|---|
| 3,515,496 A | | 6/1970 | Eddy |
| 4,008,018 A | * | 2/1977 | McDermott ............ F01C 21/18 418/171 |
| 6,640,687 B1 | | 11/2003 | Frantz et al. |
| 7,435,066 B2 | | 10/2008 | Enzaka et al. |
| 2005/0063851 A1 | | 3/2005 | Phillips |
| 2009/0196772 A1 | | 8/2009 | Watanabe et al. |
| 2015/0198156 A1 | | 7/2015 | Odenmarck et al. |

FOREIGN PATENT DOCUMENTS

| | | | | |
|---|---|---|---|---|
| CN | 203201737 U | | 9/2013 | |
| EP | 0 258 797 A2 | | 3/1988 | |
| EP | 1710437 A2 | | 10/2006 | |
| EP | 2 497 950 A1 | | 9/2012 | |
| EP | 2 628 951 A1 | | 8/2013 | |
| GB | 702596 A | * | 1/1954 | ............ F01B 3/0032 |
| GB | 920265 A | | 3/1963 | |
| GB | 1349990 A | * | 4/1974 | ............ F01B 3/0055 |
| JP | 07035053 A | | 2/1995 | |
| JP | 2001-200782 | | 7/2001 | |
| WO | 03/052272 A1 | | 6/2003 | |
| WO | 2012120094 A2 | | 9/2012 | |

OTHER PUBLICATIONS

Chinese Search Report dated Nov. 23, 2017, Application No. 2014107995504, 2 Pages.
Chinese First Office Action dated Dec. 1, 2017, Application No. 201410799550.4, Applicant Volvo Car Corporation, 5 Pages.
Chinese Search Report dated Nov. 27, 2017, Application No. 2014108023302, 2 Pages.
Extended European Search Report dated Mar. 14, 2017, Application No. 14150742.6-1608, Applicant Volvo Car Corporation, 7 Pages.
U.S. Office Action dated Apr. 6, 2017, U.S. Appl. No. 14/571,413, 13 Pages.
U.S. Final Office Action dated Nov. 30, 2017, U.S. Appl. No. 14/571,413, 9 Pages.

* cited by examiner

DISPLACEMENT PUMP AND A CONTROL RING FOR A DISPLACEMENT PUMP

CROSS-REFERENCE TO RELATED APPLICATIONS

This application claims foreign priority benefits under 35 U.S.C. § 119(a)-(d) to European patent application number EP 14150744.2, filed Jan. 10, 2014, which is incorporated by reference in its entirety.

TECHNICAL FIELD

The present disclosure relates to displacements pumps and the control of a displacement pump, and especially to a control ring for a displacement pump.

BACKGROUND

The displacement of a displacement pump stationary pressure chambers, such as a bent axis piston or gerotor pump, is commonly controlled through a control ring. The control ring is provided with openings in order to control the flow of pressure medium from the displacement pump. Typically, there are two openings, which are divided by an intermediate section, referred to as a land.

When pistons/pressure chambers pass over the land between the high pressure and low pressure opening of a control ring, the pressure is decreasing/increasing rapidly due to the land blocking the pressure medium. When the opening has passed over the land and reaches the opening in the control ring a pressure spike/pressure dip causing vibration and noise occurs due to the large pressure differences.

Pre-compression/pre-decompression and how it varies dependent of the position of the control ring. In a displacement pump with a control ring arranged for 100% displacement, the pressure rises slowly over the land. In a displacement pump with a control ring arranged for 0% displacement, the pressure rises very high over the land, causing high pressure differences between the outlet openings and the opening in the control ring to which it opens to. The standard solution of today is a compromise, in which the land is adapted such that it gives an ideal pre-compression in an intermediate position of the control ring. An obvious drawback to this solution is that in any other control position of the displacement pump, the pre-compression becomes to large/small, whereby the displacement pump still will have problems with pressure pulses and there from derived vibrations and disturbing noises. A displacement pump according to the prior art is disclosed in WO 12120094.

SUMMARY

An object of the disclosure is to suggest a control ring and a displacement pump that minimizes the pressure pulses in a displacement pump with stationary pressure chambers.

The disclosure is based upon the idea that the pre-compression/pre-decompression over the land can be varied, which in the present disclosure is achieved through that the size of the land is varied. According to the inventive solution the design of the land is such that by adjusting the position of the control ring the size of the land (i.e., the active land over which the pressure chamber passes) can be varied dependent of the position of the control ring.

The disclosure can advantageously be applied to a control ring provided for controlling the flow of a pressure medium in displacement pump stationary pressure chambers. The control ring is centred about a first rotational axis about which it extends. The control ring is further provided with a first and a second axial surface.

The first axial surface is provided with an interface section having at least a first and a second opening. The first and second openings are arc shaped and are separated by a first and a second intermediate section in the further text referred to as land. When the control ring is used within a displacement pump, one of the openings is a high pressure opening. The high pressure opening can be any of the two openings, and can also change dependent of which direction the displacement pump is driven in.

According to the disclosure, a pre-compressions/pre-decompression is achieved in that the first land is provided with a tapered groove. The tapered groove extends from the first opening into the first land and having its broader edge in direction of the first opening and its tip in direction of the second opening. The tapered groove extends into the first land such that an angular distance between the first and second openings over the first land is different at different radial distances.

By arranging a control ring according to the disclosure in a displacement pump with an offset between the first rotational axis and a second rotational axis (e.g., rotational axis of the displacement pump), the tapered groove will vary the length of the first land depending on in which rotational position the control ring is placed. This is explained in further detail in detailed description of the drawings.

In one aspect of the disclosure the first tapered groove is arranged at an inner circumference of the first opening and the first land is provided with a second tapered groove, which is correspondently arranged as the first tapered groove at an outer circumference of the first opening. By providing the first land with two tapered grooves each directed from the first opening into the land and at the outer and the inner circumference respectively, the first land can be varied in both rotational directions of the control ring from the 100% displacement position.

In one aspect of the disclosure the first land is provided with a third and fourth tapered groove, extending correspondently from the second opening, into the first land, as the first and second tapered grooves from the first opening.

In a further aspect of the disclosure the second land is provided with a corresponding number of tapered grooves as the first land. By providing the first land with tapered grooves in all of its four corners a rotational weight balance of the control ring is easily facilitated.

To achieve the first beneficial effect of the disclosure, i.e., enable a variable land and thereby avoid vibrations and disturbing noises due to high pressure spikes, only one tapered groove is needed. Above are combinations with one, two and four tapered grooves in one or both lands described. The disclosure does however not exclude any other not described number of tapered grooves. Any combination of one-four tapered grooves at one of the lands or both of the lands are possible and within the scope of the disclosure.

In one aspect of the disclosure the tapered grooves are continuously tapered. In an alternative solution the tapered grooves are provided with a stepped tapered form.

In one further aspect of the disclosure the first and the second opening are mouthing to a corresponding mouthing area provided at either of an inner and outer radial surface.

The disclosure further concerns a pumping device comprising a pump unit provided with a control ring according to the disclosure. The pump unit is provided with a rear plate and axial outlets. The pump unit is centred about a rotational axis, further referred to as a second rotational axis. The axial outlets are provided at the rear plate rotational symmetrical about the second rotational axis. The rear plate is adapted to rotate about the second rotational axis. The control ring is adapted to abut against a rear plate such that by rotating the control ring a displacement of the pumping device can be changed between 100 and zero %.

The control ring is centred about the first rotational axis, which in the pumping device is eccentric from the second rotational axis such that when the control ring is arranged for 100% displacement, the axial outlets passing over the first land is fully blocked by the first land during a first predetermined angular distance, and when the control ring is positioned for 0% displacement the axial outlets passing over the first land are fully blocked by the first land during a second predetermined angular distance, wherein the first predetermined angular distance is longer than the second predetermined angular distance.

The pumping device provided with the above control ring enables a variable land. Due to the eccentric arrangement of the control ring and that a first tapered groove is provided in the first land, the angular distance along which an axial outlet of the pumping unit passes over the first land and is fully covered by it can be varied dependent on the position of the control ring.

When the control ring is positioned in a position for 100% displacement, the land is arranged between the high pressure and the low pressure chamber. In this position the pressure is raised minimal for each angular distance the axial outlets are moved over the land. Therefore it is desired that the axial outlets are block by the land sufficiently long to build up a pressure in the outlet opening passing over the land, which correlates with the pressure in the high pressure chamber. Hence, the length of the land is adjusted to achieve such a pressure rise in the outlet opening. Because the pressure thereby is essentially equal in the outlet opening as in the high pressure chamber, there will be no pressure spikes causing vibrations or noise as the outlet openings can start to deliver pressure medium into the high pressure chamber.

When the control ring is positioned for 0% displacement, i.e., rotated 90 degrees from the 100% displacement position; the land is arranged in the middle of the high pressure chamber, where the pressure raises quickly with the angular distance the axial outlets are moved over the land. Therefore it is desired that the axial outlets are blocked by the land as short time as possible. Hence, the tapered groove in the first land is adjusted such that the axial outlet only is fully closed by the land during a very short angular distance, before it enters the high pressure chamber.

Due to the eccentric arrangement of the control ring relative the pumping unit and the tapered grooves in the first land, the angular distance the land fully covers the axial outlets can be varied with the position of the control ring. The inclination of the tapered grooves is dependent of the offset of the second rotational axis from the first rotational axis.

In a preferred embodiment, the control ring is provided with four tapered grooves in each of the two lands. One tapered groove is thereby provided in each corner of the land. By providing the tapered grooves in each corner of the two lands, a variable land can be achieved in all directions of rotation of the control ring.

In one aspect of the disclosure the pumping unit is a gerotor pump unit. In another aspect of the disclosure, the pumping unit is an axial piston pump.

It is preferred that the pumping unit and the control ring are arranged within the same housing.

BRIEF DESCRIPTION OF THE DRAWINGS

The present disclosure will now be described in detail with reference to the below drawings, wherein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
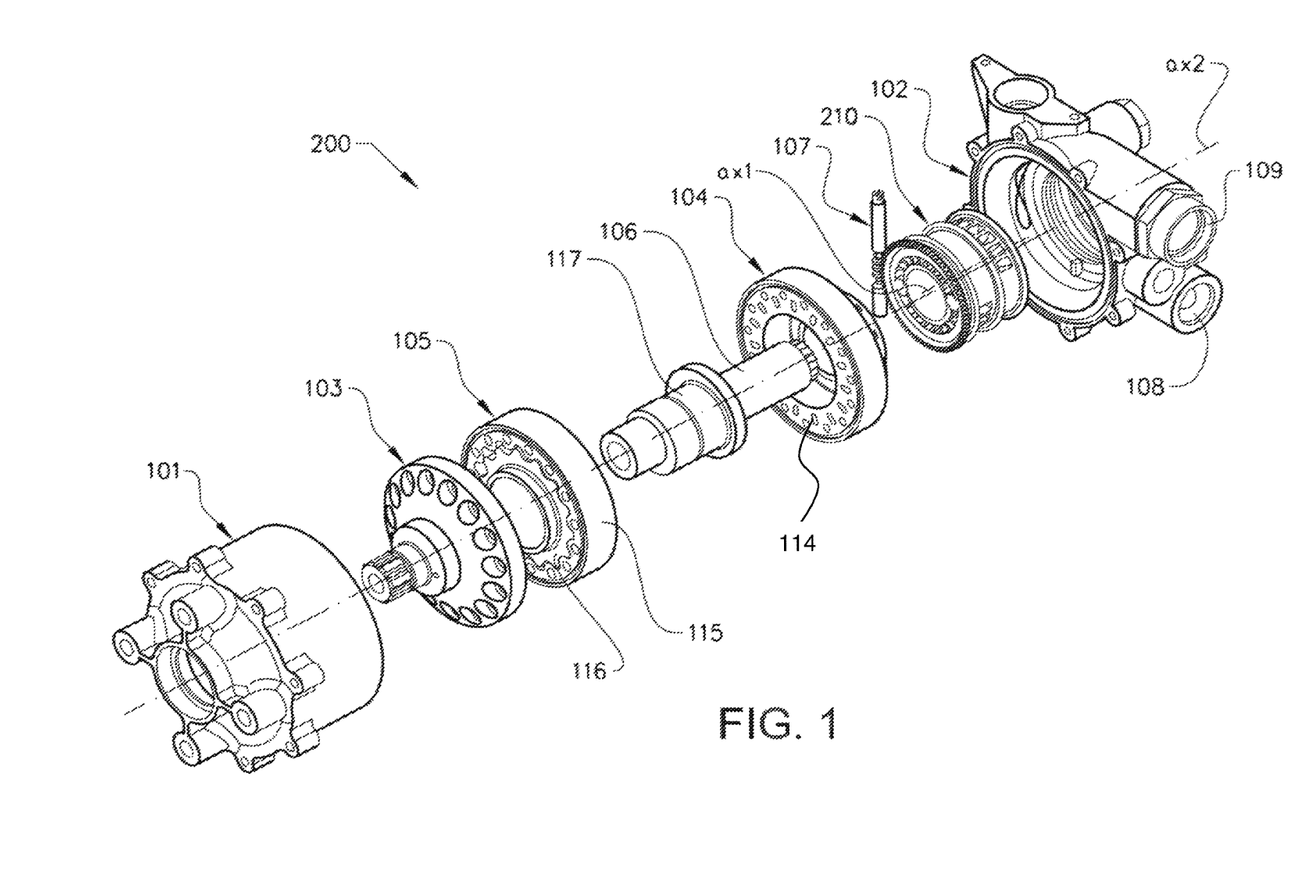
FIG. 1 discloses a gerotor pump provided with a control ring according to the disclosure.

FIG. 1 discloses a displacement pump 200, in which a control ring 210 according to the disclosure is provided. The displacement pump 200 is disclosed as a gerotor pump. The control ring 210 is however compatible with any displacement pump having stationary pressure chambers. The displacement pump 200 comprises a front and a back housing 101, 102, a front and a rear plate 103, 104, in between which a pumping unit 105 is arranged. The pumping unit 105 comprises a rotor set of an outer rotor 115 and an inner rotor 116, whereby the inner rotor 116 is provided upon an eccentric shaft 106. The pumping unit 105 is provided in between the front and the rear plate 103, 104, wherein the rear plate 104 is provided with supply conduits 114 in order to connect the pressure chambers of the pumping unit 105 with an inlet and an outlet 108, 109 in the rear housing 102.

In the embodiment shown, the control ring 210 is provided in between the rear plate 104 and the rear housing 102, such that it controls the flow of pressure medium between the inlet and the outlet 108, 109 and the pressure chambers of the pumping unit 105. The control ring 210 could however be arranged directly against a pumping unit, independently if it is a gerotor, bend axis pump or another displacement pump with stationary pressure chambers. An actuator pin 107 is provided, which acts upon a gearing 207 of the control ring 210 in order to rotate the control ring 210 into different control positions. By rotating the control ring 210, the displacement of the displacement pump 200 can be set between 0 and 100%. The control ring 210 is centred about a rotational axis ax1, which is eccentric to the centre axis ax2 of the displacement pump 101. In FIG. 1, the displacement pump 100 is provided with a control ring 210 disclosed in FIGS. 2a-e. The displacement pump 100 could however also be provided with a control ring 310 disclosed in FIGS. 3a-d.

By turning the control ring 210 between 0 and 90 degrees the flow of the pressure medium from the displacement pump 200 can be controlled between 100 and zero % displacement. The control ring can be turned over 90 degrees, whereby the inlet and outlet 108, 109 change places, i.e., the flow direction becomes reverse, whereby the pumping unit 105 still rotates in the same direction. In the two embodiments of the control ring 210; 310 disclosed in FIGS. 2a-e and 3a-d respectively, the variation in angular distance the axial openings 260; 360 travel over the lands 215, 216; 315, 316 is achieved for all turning angles of the control ring 210; 310.

The general function of the displacement pump 101 is known and will not be described further. With the control ring 210 according to the disclosure the displacement of the displacement pump 100 can be controlled by rotating the control ring 210 relative the rear plate 104 and thereby the pressure chambers of the pumping unit 105. Due to the control ring 210 an angular distance that the axial outlets of the rear plate 104 passes over the land of the control ring and are fully blocked thereby, can be varied with the displacement of the pumping unit 105.

FIGS. 2a-e disclose a first embodiment of the control ring 210. The control ring 210 has an inner diameter d and an outer diameter D, a first and a second axial surface 213, 214, and an inner and an outer radial surface 211, 212. The control ring 210 is centred about its rotational axis ax1.

The first axial surface 213 is provided with an interface section 220 with a first and a second opening 221, 222. The first and the second opening 221, 222 are separated with a first and a second intermediate sections, i.e., lands 215, 216. The interface section 220 is adapted to connect to the pressure chambers of pumping unit 105 via the rear plate 104. As can be seen in the FIG. 1, the first and the second opening 221, 222 are shaped as circular arcs and follow the circumference of the control ring 210. It shall be noted that the control ring 210 could also be arranged directly against the pumping unit 105; this however is mostly suitable for a device with lower pressures. The first and the second opening 221, 222 are separated by a first and a second land 215, 216. The first and the second opening 221, 222 are constructed by several smaller openings which all have a common upper space, such that the pressure in the whole opening 221, 222 is the same.

In the embodiment disclosed in FIGS. 2a-e the first and second openings 221, 222 of the control ring 210 are mouthing to the outer radial surface 212, however at a different axial distance from the first axial surface 213. The different axial distance of the mouthing is important in order to create two separate mouthing areas. A first, a second and a third seal ring 223, 224, 225 are thereby also provided at the outer radial surface 212, in order to create mouthing spaces between the control ring 210 and the rear housing 102. One of the inlet and outlet 108, 109 (FIG. 1) is connected to a respective mouthing area/space between the seal rings 223, 224, 224.

Now, as can be seen in the Figures, the first and the second land 215, 216 are each provided with four tapered grooves 240-243, 244-247. As can be seen, all the tapered grooves 240-247 extend from either of the first and second openings 221, 222 into either of the first and second lands 215, 216. The broader edges of the tapered grooves 240-247 are directed towards the first or the second opening 221, 222 and the tips of the tapered grooves 240-247 are directed into the first or the second land. The tapered grooves 240-247 are further located in each corner of the first and the second land 215, 216, such that they extend the first and second openings into the first and second lands.

Figure 2A:
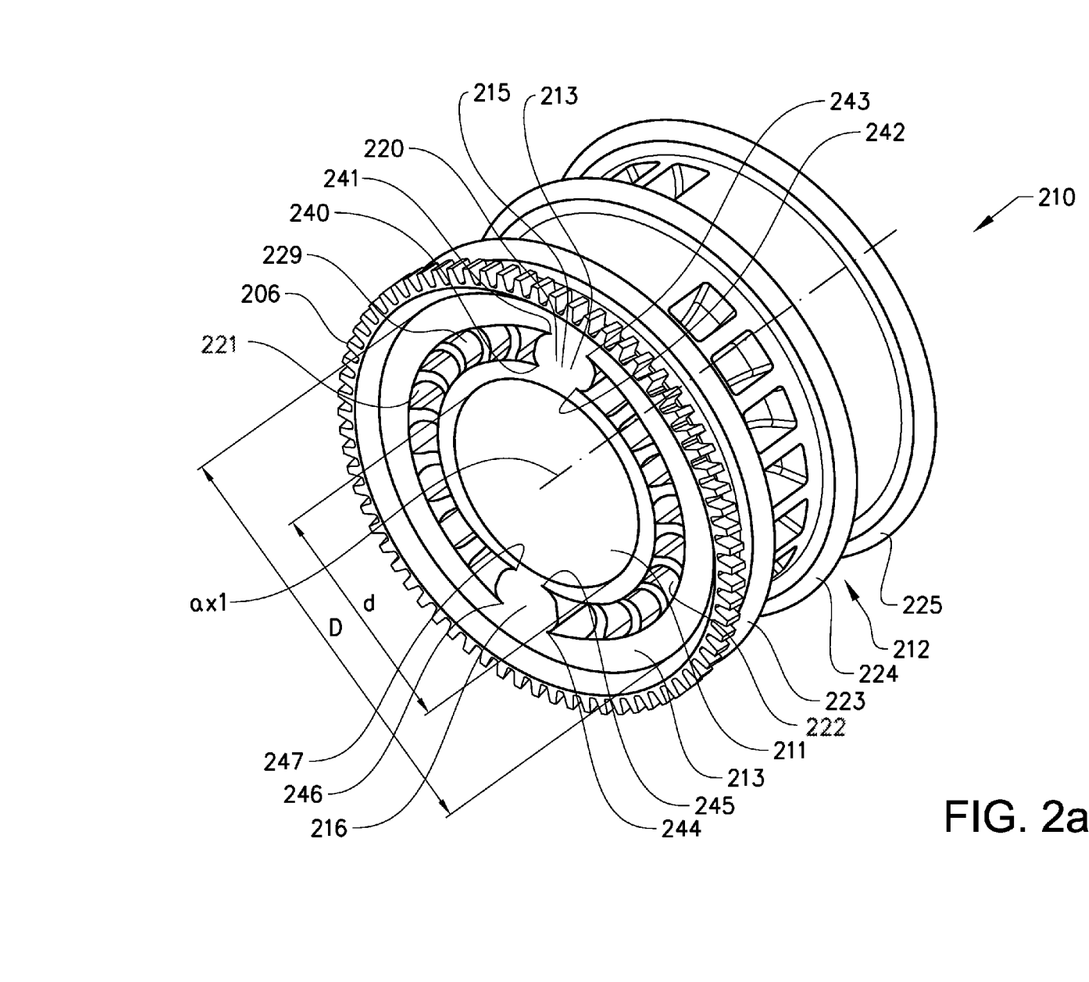
FIGS. 2a-e disclose an embodiment of the control ring in a position of the control ring allowing 100% displacement.
Figure 2B:
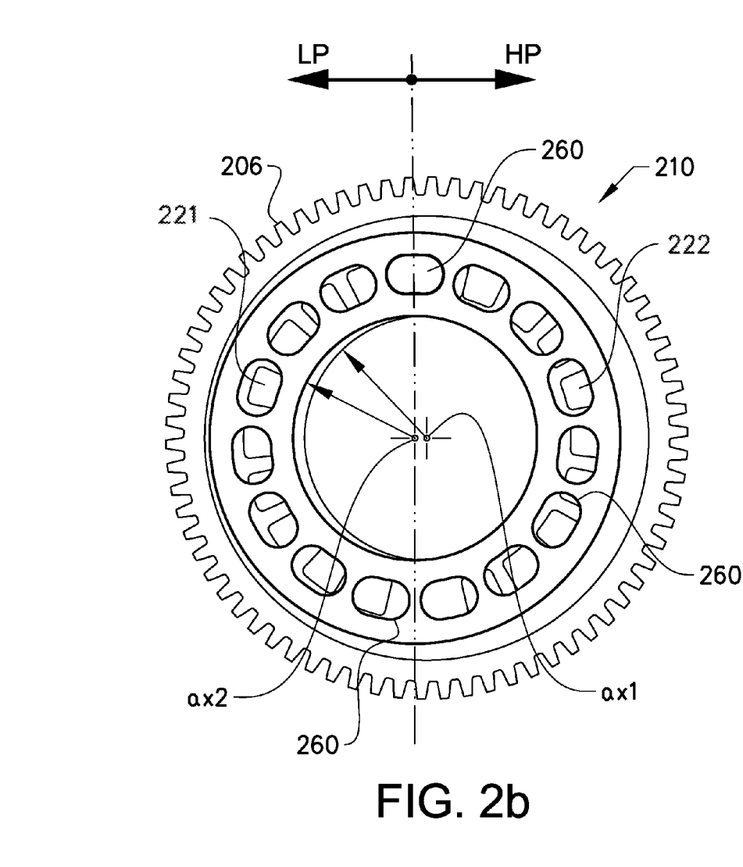

In FIG. 2b the control ring 210 is disclosed with a cut out of the end plate 104 just where it abuts against the control ring 210. The rear plate 104 is centered about the rotational axis ax2 of the displacement pump 200, whereby the control ring 210 is eccentric arranged relative the rear plate 104 and is centered about the rotational axis ax1. In the rear plate 104 the axial outlet openings 260 can be seen. At some point when the axial outlet openings 260 pass over the first and the second land 215, 216, the axial outlet openings 260 are completely blocked by the first and the second land 215, 216 respectively. The blocking is necessary to avoid the high pressure chamber HP and the low pressure chamber LP to be connected. However, during the passing over the first and the second land 215, 216 respectively a pressure rise/pressure drop in the outlet openings 260 occurs, because of the blocking.

The control ring 210 can be turned in order to change the displacement of the pumping device and thereby also change the position of the first and the second land 215, 216. In FIG. 2b, the control ring 210 is positioned such that the first land and the second land 115, 116 are positioned in between the high pressure chamber HP and the low pressure chamber LP of the pumping unit 105. This position means that the displacement pump is controlled to deliver 100% displacement. At the transmission between the high pressure chamber HP and the low pressure chamber LP and vice verse, the pressure rises slowly. This means that a small pressure increase occurs for each angular distance a blocked outlet opening 260 travels over the first land 116 and a small pressure decrease occurs for each angular distance a blocked outlet opening 260 travels over the second land 216.

In FIGS. 2c-e and FIGS. 3b-d only one axial outlet 260 is illustrated together with the outlines for the rotational path for the axial outlets 260, this to illustrate the movement of the axial outlets 260 over the first and the second land and function of the tapered grooves 240-247.

Figure 2C:
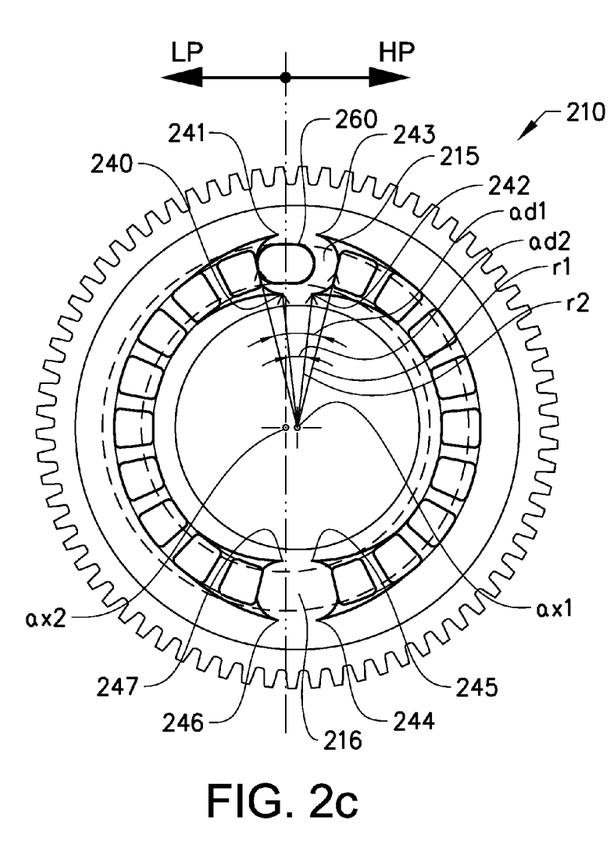

In FIG. 2c the control ring 210 is in the same position as in FIG. 2b, i.e., 100% displacement. In FIG. 2c the illustrated axial outlet 260 is in a position such that it just has become fully blocked by the first land 215. In this position no pressure medium can be provided out from the illustrated axial outlet 260. Further, in FIG. 2c, two different radial distances r1, r2 from center axis ax1 to the first land 215 of control ring are symbolically shown with arrows, whereby also two different angular distances ad1, ad2 over the first land 215 are clearly visible. How the angular distance varies with the radial distance is dependent on shape of the tapered grooves 241-243. The same applies for the second land 216.

Figure 2D:
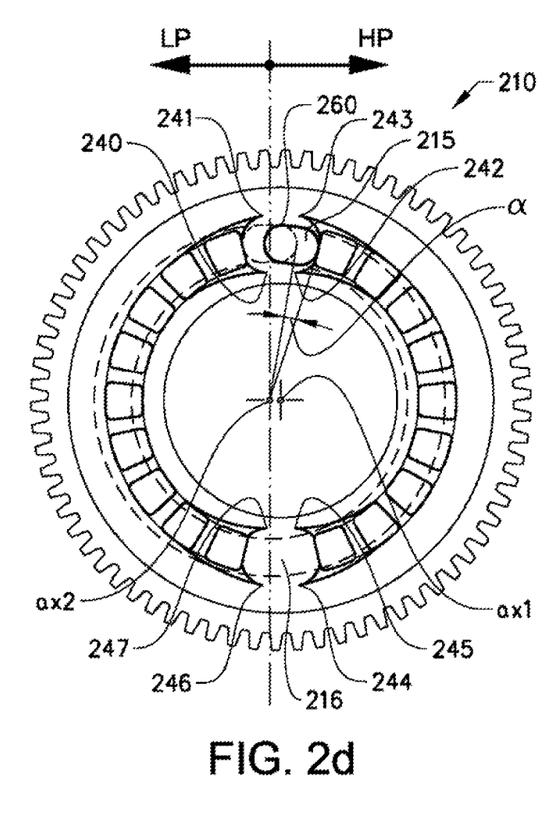

In FIG. 2d the control ring 210 is still in the same position as in FIG. 2c, however, the illustrated axial outlet 260 is in a position such that it is just about to open to the first opening 221, i.e., not be fully blocked by the first land 215 anymore. The position of the axial outlet 260 in FIG. 2c is shown with dashed lines. The axial outlet 260 has thereby moved as angular distance α between FIG. 2c and FIG. 2d. The angular distance α is the angular distance the axial outlet 260 travels over the first land 215 and is fully blocked thereby, when the control ring 210 is positioned in a position for 100% displacement. It is preferred that the angular distance α is adapted such that the pressure increases in the axial outlets 260 during the movement over the first land 215 to the same pressure as in the first opening 221.

In the embodiment shown in FIG. 2d the illustrated axial outlet 260 does not pass over the tapered grooves 240-243 in the first land 215. However, for the disclosure, it is not important if the tapered grooves 240-243 are passed or not. What is important is the angular distance the axial outlet 260 travels over the first land 215 and is fully blocked. The angular distance can be varied dependent on the position of the control ring 210 due to the control ring 210 is eccentric arranged relative the pumping unit 105 and the tapered shape of the tapered grooves 240-243.

The eccentric arrangement of the control ring 210 and the shape of the tapered grooves 240-243 are adapted to each other such that a change in position of the control ring 210 changes at which radial distance the axial outlets 260 are fully blocked, and then opened by the tapered grooves 240-243 to the first or second opening 221, 222.

Figure 2E:
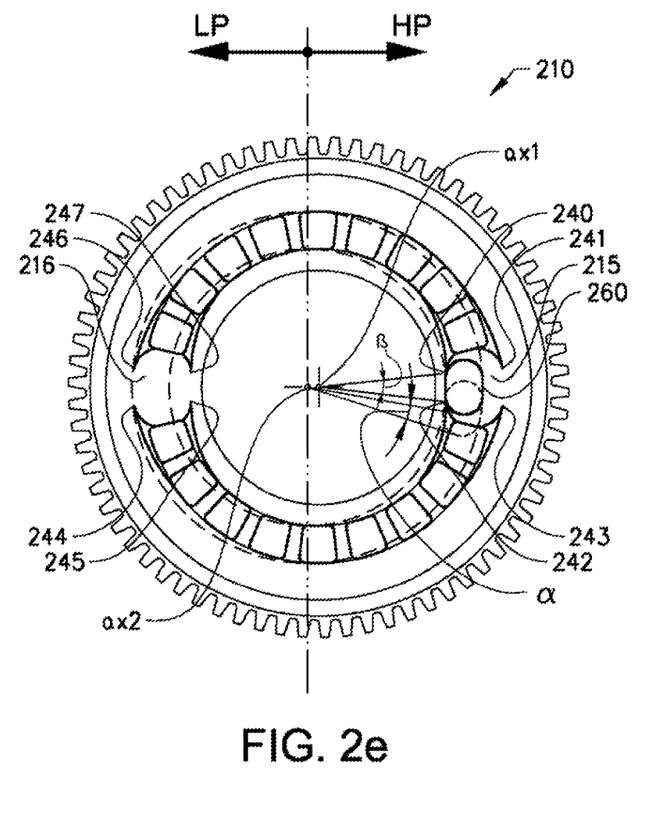

In FIG. 2e the control ring 210 is arranged in a position for a 0% displacement. In this position the axial outlets 260 pass the longest distance over the tapered grooves 240, 242, whereby the angular distance β that the axial outlets 260 are fully blocked by the first land 215 is the shortest than in any other position of the control ring 210. In an ideal case the angular distance between the fully blocking of the axial outlets 260 and the reopening is zero, whereby no additional pressure will be able to be build up during the passing of the first land 215.

In the FIGS. 2a-e only the first land 215 has been dealt with, and only the tapered grooves 240 and 242 are affected by the disclosed turning of the control ring 210. However by turning the control ring 210 the same angular distance in an opposite direction as what is disclosed between FIG. 2d and e, the same effects are achieved with the tapered grooves 241 and 243.

Further the design of the second land 216 and its tapered grooves 244-247 is such that the axial outlets 260 are fully blocked the same axial distance over the second land 216 for one position of the control ring 210 as the axial outlets 260 are fully covered by the first land 215. Hence, the second land 216 and its tapered grooves 244-247 are a mirroring of the first land 215 and its tapered grooves 240-243.

Figure 3A:
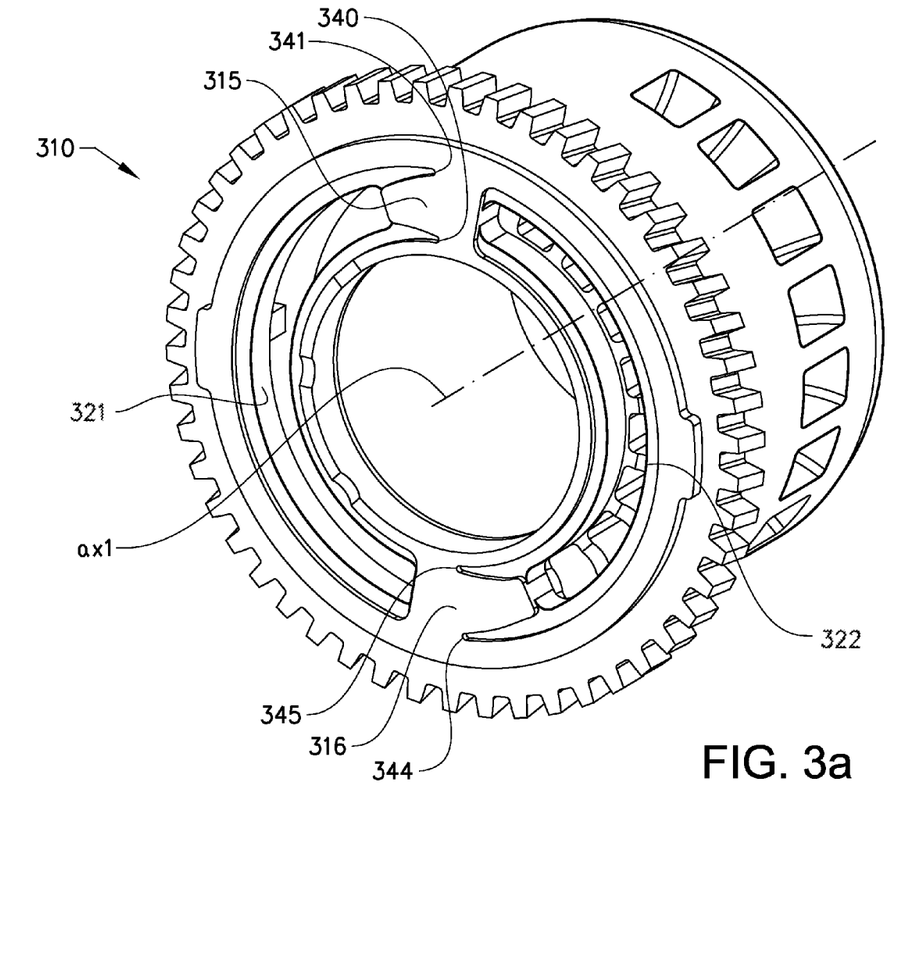
FIGS. 3a-d disclose the interaction between the control ring and the axial outlet openings in a position of the control ring allowing 0% displacement.
Figure 3B:
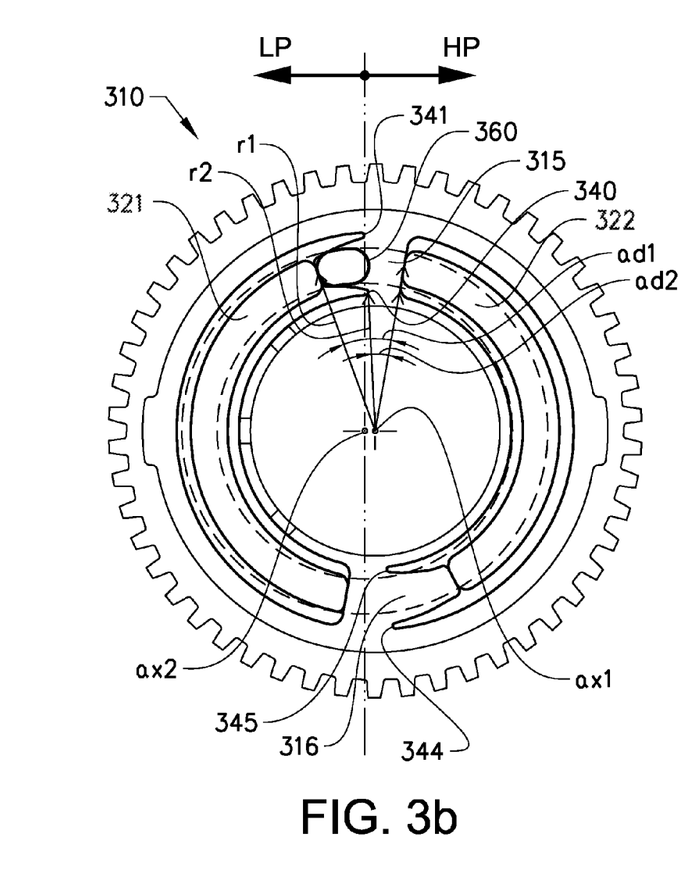
Figure 3C:
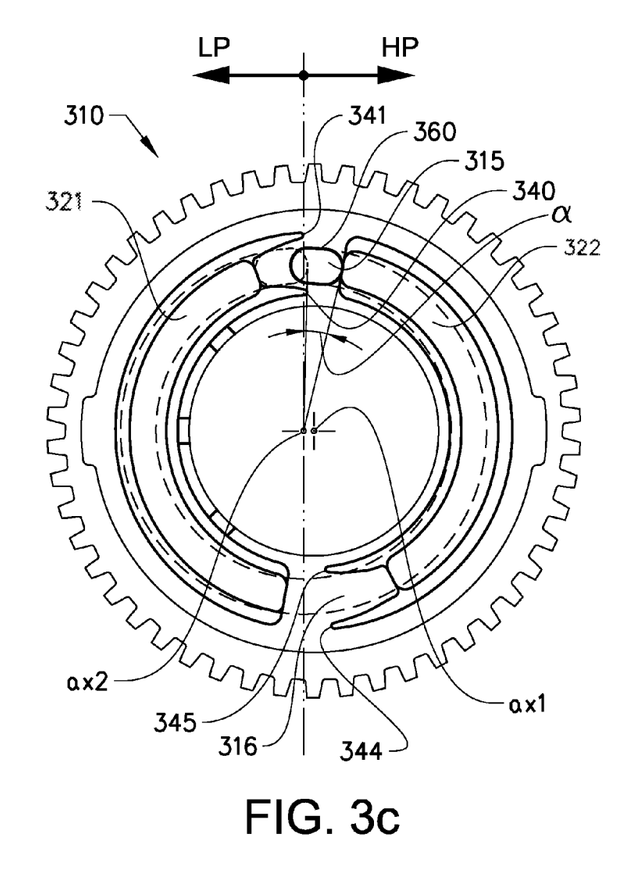
Figure 3D:
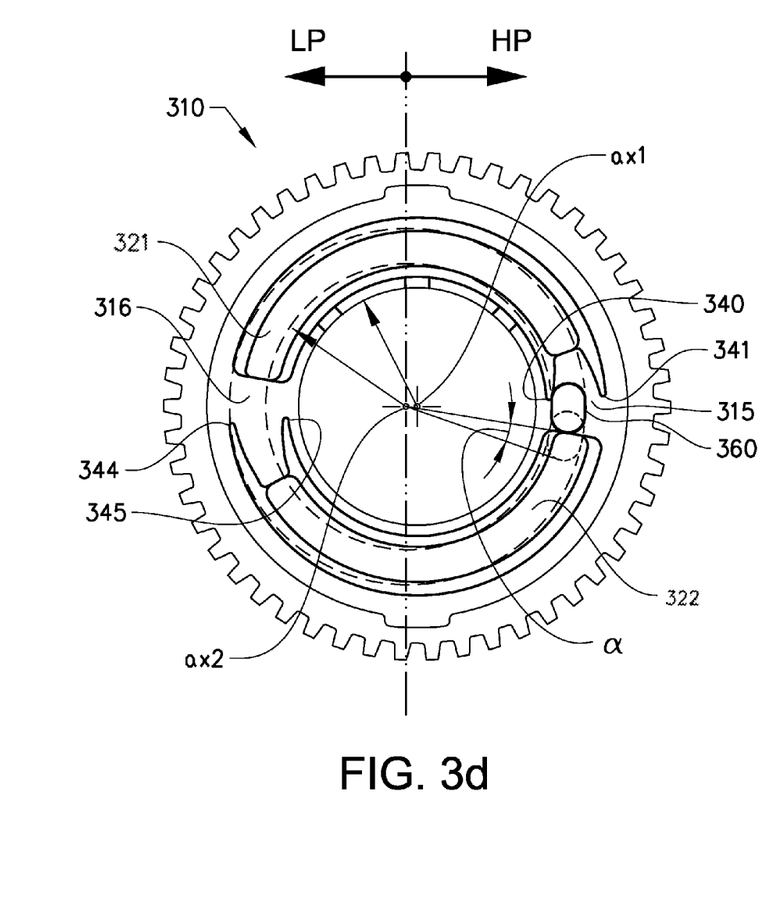

In FIGS. 3a-d a second embodiment of the control ring 310 is disclosed. The control ring 310 differs from the control ring 210 in FIGS. 2a-e in that it is provided with four tapered grooves 340, 341, 344 and 345, instead of eight. FIG. 3a discloses a perspective view of the control ring 310. FIGS. 3b-d show the control ring 310 and one axial outlet opening 360 and the travelling path of the outlet openings 360. The description of FIG. 2c and FIG. 2d applies mutatis mutandis to FIG. 3b and FIG. 3c respectively and the description of FIG. 2e applies mutatis mutandis to FIG. 3d. The numbering of the FIGS. 3a-d corresponds to the numbering of the FIGS. 2a-e, whereby in FIGS. 3a-d the numbering has the prefix 3 instead of 2 as in FIGS. 2a-e.

Independent of which embodiment of the disclosure that is implemented, it is the relation between the shape of the tapered grooves 240-247; 340, 341, 344, 345 and the eccentricity of the control ring 210; 310 that determines the variation of the length of the first and the second land 215, 216; 315, 316. Wherein the tapered grooves 240-247; 340, 341, 344, 345 and the eccentricity of the control ring 210; 310 is adapted such that a pressure in the axial outlets 260; 360 is adapted to a pressure in the one of the first and the second opening 221, 222; 321, 322 that the axial opening 260, 360 is open to next, i.e., that the pressure in the axial outlets 260; 360 is increased to the pressure of the high pressure opening when opened up to the high pressure opening and is decreased to the pressure of the low pressure opening when opened up to a low pressure opening. When implemented in a pumping device, the shape of the axial outlets 260; 360 of the pumping unit are adapted to the shape of the first and the second land 215, 216; 315, 316, such to allow the difference in angular distance between closing and opening an axial outlet 260; 360 at different turning angles of the control ring 2160; 360.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pumping device comprising:
   a rotatable control ring centered on a first rotational axis for controlling flow of a medium, the control ring comprising first and second axial surfaces, the first axial surface having an interface section provided with at least first and second openings, the first and second openings being arc shaped and separated by first and second lands, wherein the first land is provided with a first tapered groove extending from the first opening into the first land, the first tapered groove having a broad edge facing in a direction of the first opening and a tip facing in a direction of the second opening, wherein the first tapered groove extends into the first land such that an angular distance between the first and second openings along the first land is different at different radial distances, wherein the first tapered groove is arranged at an inner circumference of the first opening, and the first land is provided with a second tapered groove that is arranged at an outer circumference of the first opening, the second tapered groove having a broad portion facing in a direction of the first opening and a tip that is narrower than the broad portion and which faces in a direction of the second opening;
   a pump unit including pressure chambers; and
   a rear plate disposed between the pumping unit and the control ring and adapted to rotate about a second rotational axis, the rear plate having axial outlets that are positioned rotationally symmetrical about the second rotational axis;
   wherein the control ring is adapted to abut against the rear plate such that by rotating the control ring a displacement of the pumping device can be changed between 100 and 0%, and wherein the first rotational axis is eccentric with respect to the second rotational axis such that
      when the control ring is positioned for 100% displacement and the rear plate is rotated relative to the control ring, the axial outlets passing over the first land are fully covered by the first land during a first predetermined angular distance, and
      when the control ring is positioned for 0% displacement and the rear plate is rotated relative to the control ring, the axial outlets passing over the first land are covered by the first land during a second predetermined angular distance, wherein the first predetermined angular distance is longer than the second predetermined angular distance.

2. The pumping device according to claim 1 wherein the second land of the control ring is provided with a tapered groove extending from the second opening into the second land.

3. The pumping device according to claim 1 wherein the first land of the control ring is provided with third and fourth tapered grooves extending from the second opening, each of the third and fourth tapered grooves having a broad edge facing in a direction of the second opening and a tip facing in a direction of the first opening.

4. The pumping device according to claim 3 wherein the second land of the control ring is provided with fifth and sixth tapered grooves extending from the second opening, and seventh and eighth tapered grooves extending from the first opening.

5. The pumping device according to claim 4 wherein the tapered grooves are stepped or continuously tapered.

6. The pumping device according to claim 1 wherein the second land of the control ring is provided with third and fourth tapered grooves extending from the second opening into the second land.

7. The pumping device according to claim 1 wherein the control ring further comprises inner and outer radial surfaces, and wherein the first and second openings extend to a corresponding area provided at either of the inner and outer radial surfaces.

8. The pumping device according to claim 1 wherein the pumping unit is a gerotor pump unit.

9. The pumping device according to claim 1 wherein an inclination of the first tapered groove is dependent on an offset of the second rotational axis from the first rotational axis.

10. The pumping device according to claim 1 further comprising a housing inside of which the pumping unit and the control ring are provided.

11. The pumping device according to claim 1 wherein the first and second grooves of the control ring are spaced apart from each other.

12. The pumping device according to claim 1 wherein the first tapered groove of the control ring extends radially inwardly with respect to the inner circumference of the first opening.

13. The pumping device according to claim 12 wherein the second tapered groove of the control ring extends radially outwardly with respect to the outer circumference of the first opening.

14. The pumping device according to claim 1 wherein, when the control ring is positioned for 100% displacement and the rear plate is rotated relative to the control ring, the axial outlets of the rear plate do not pass over the first and second tapered grooves of the control ring, and wherein, when the control ring is positioned for 0% displacement and the rear plate is rotated relative to the control ring, the axial outlets of the rear plate pass over the first tapered groove of the control ring.

15. A pumping device comprising:
a control ring configured to rotate about a first rotational axis for controlling flow of a medium, the control ring comprising first and second axial surfaces, the first axial surface having an interface section provided with at least first and second openings, the first and second openings being arc shaped and separated by first and second lands, the interface section further having a first tapered groove that extends from the first opening into the first land, the first tapered groove having a broad portion facing in a direction of the first opening and a tip that is narrower than the broad portion and which faces in a direction of the second opening, wherein the first tapered groove extends the first opening into the first land such that an angular distance between the first and second openings along the first land is different at different radial distances, wherein the first tapered groove is arranged at an inner edge of the first opening, and the interface section further is provided with a second tapered groove arranged at an outer edge of the first opening so that the first and second tapered grooves are spaced apart from each other, the second tapered groove extending from the first opening into the first land and having a broad portion facing in a direction of the first opening and a tip that is narrower than the broad portion and which faces in a direction of the second opening;
a pump unit including pressure chambers; and
a rear plate disposed between the pumping unit and the control ring and configured to rotate about a second rotational axis, the rear plate having axial outlets;
wherein the control ring is configured to abut against the rear plate such that by rotating the control ring a displacement of the pumping device can be changed between 100 and 0%, and wherein the first rotational axis is eccentric with respect to the second rotational axis such that
when the control ring is positioned for 100%displacement and the rear plate is rotated relative to the control ring, the axial outlets passing over the interface section are fully covered by the interface section during a first predetermined angular distance, and
when the control ring is positioned for 0% displacement and the rear plate is rotated relative to the control ring, the axial outlets passing over the interface section are covered by the interface section during a second predetermined angular distance, wherein the first predetermined angular distance is longer than the second predetermined angular distance.

16. The pumping device of claim 15 wherein the interface section of the control ring is provided with third and fourth tapered grooves extending from the second opening into the first land, each of the third and fourth tapered grooves having a broad portion facing in a direction of the second opening and a tip facing in a direction of the first opening.

17. The pumping device of claim 15 wherein the interface section of the control ring further has third and fourth tapered grooves extending from the second opening into the second land.

18. The pumping device of claim 17 wherein the interface section of the control ring is further provided with fifth and sixth tapered grooves extending from the second opening, and seventh and eighth tapered grooves extending from the first opening.

19. The pumping device of claim 15 wherein the pumping unit is a gerotor pump unit.

20. The pumping device of claim 15 wherein an inclination of the first tapered groove is dependent on an offset of the second rotational axis from the first rotational axis.

21. The pumping device of claim 15 further comprising a housing inside of which the pumping unit and the control ring are provided.

22. The pumping device according to claim 15 wherein, when the control ring is positioned for 0% displacement, the control ring is rotated 90° relative to the position of the control ring when the control ring is positioned for 100% displacement.

23. The pumping device according to claim 15 wherein the first tapered groove of the control ring extends radially inwardly with respect to the inner circumference of the first opening.

24. The pumping device according to claim 15 wherein, when the control ring is positioned for 100% displacement and the rear plate is rotated relative to the control ring, the axial outlets of the rear plate do not pass over the first and second tapered grooves of the control ring, and wherein, when the control ring is positioned for 0% displacement and the rear plate is rotated relative to the control ring, the axial outlets of the rear plate pass over the first tapered groove of the control ring.

25. The pumping device according to claim 15 wherein, when the control ring is positioned for 0% displacement, the control ring is rotated 90° relative to the position of the control ring when the control ring is positioned for 100% displacement.

26. The pumping device according to claim 15 wherein the pumping unit comprises an outer rotor and an inner rotor that cooperate to define the pressure chambers.

* * * * *

UNITED STATES PATENT AND TRADEMARK OFFICE
CERTIFICATE OF CORRECTION

| | | |
|---|---|---|
| PATENT NO. | : 10,167,866 B2 | Page 1 of 1 |
| APPLICATION NO. | : 14/578600 | |
| DATED | : January 1, 2019 | |
| INVENTOR(S) | : Jonas Forssell et al. | |

It is certified that error appears in the above-identified patent and that said Letters Patent is hereby corrected as shown below:

In the Claims

Column 10, Line 14, Claim 15:
After "the control ring is positioned for"
Delete "100%displacement" and
Insert -- 100% displacement --

Signed and Sealed this
Seventh Day of May, 2019

Andrei Iancu
*Director of the United States Patent and Trademark Office*